United States Patent
Hashimoto et al.

[11] Patent Number: 6,101,765
[45] Date of Patent: Aug. 15, 2000

[54] VEHICLE DOOR AND METHOD FOR ITS ASSEMBLY

[75] Inventors: Hideyuki Hashimoto; Kimito Nakagomi; Kenichi Ishikawa, all of Aichi, Japan

[73] Assignee: Asahi Glass Company Ltd., Tokyo, Japan

[21] Appl. No.: 09/147,303

[22] PCT Filed: Mar. 24, 1998

[86] PCT No.: PCT/JP98/01274

§ 371 Date: Nov. 24, 1998

§ 102(e) Date: Nov. 24, 1998

[87] PCT Pub. No.: WO98/42526

PCT Pub. Date: Oct. 1, 1998

[30] Foreign Application Priority Data

Mar. 25, 1997 [JP] Japan ................................ 9-72046

[51] Int. Cl.[7] .................................................. B60J 5/04
[52] U.S. Cl. .......................................... 49/502; 296/146.5
[58] Field of Search ............................. 49/502, 374, 352, 49/380; 296/146.1, 146.5, 146.6

[56] References Cited

U.S. PATENT DOCUMENTS

| | | | |
|---|---|---|---|
| 4,850,636 | 7/1989 | McLaren et al. | 49/502 |
| 4,924,630 | 5/1990 | Lomasney et al. | 49/502 |
| 4,981,321 | 1/1991 | Watanabe et al. | 49/213 |
| 5,050,350 | 9/1991 | Bertolini et al. | 49/502 |
| 5,308,138 | 5/1994 | Hlavaty | 49/502 |
| 5,355,629 | 10/1994 | Kimura et al. | |
| 5,379,553 | 1/1995 | Kimura et al. | 49/502 |
| 5,536,060 | 7/1996 | Rashid et al. | 49/502 |
| 5,555,677 | 9/1996 | DeRees | 49/502 |
| 5,819,473 | 10/1998 | Hashimoto et al. | |
| 5,927,021 | 7/1999 | Kowalski et al. | 49/502 |

FOREIGN PATENT DOCUMENTS

| | | |
|---|---|---|
| 291 107 A1 | 11/1988 | European Pat. Off. . |
| 1 597 263 | 7/1970 | France . |
| 60-12334 | 1/1985 | Japan . |
| 63-53112 | 3/1988 | Japan . |
| 63-93621 | 4/1988 | Japan . |
| 63-279926 | 11/1988 | Japan . |

OTHER PUBLICATIONS

Microfilm of the Specification and Drawings Annexed to the Request of Japanese Utility Model Application No. 116709/1986 ( Laid—open No. 23446/1988 ), (Nissan Motor Co., Ltd. ) Feb. 16, 1988.

Microfilm of the Specification and Drawings Annexed to the Request of Japanese Utility Model Application No. 173804/1981 ( Laid–open No. 78377/1983 ), (Fuji Heavy Industries Ltd. ), May 27, 1983.

*Primary Examiner*—Daniel P. Stodola
*Assistant Examiner*—Curtis A. Cohen
*Attorney, Agent, or Firm*—Oblon, Spivak, McClelland, Maier & Neustadt, P.C.

[57] ABSTRACT

A door for a vehicle having an equipment mounting panel. The equipment mounting panel includes various kinds of door equipment to perform door functions. The door panel is mounted in the door by being introduced into a space formed between an outer panel and an inner panel through a rear end opening in the rear end of the door.

15 Claims, 4 Drawing Sheets

VEHICLE DOOR AND METHOD FOR ITS ASSEMBLY

BACKGROUND OF THE INVENTION

1. Field of the Invention;

The present invention relates to a vehicle door, more particularly to a vehicle door and a method for assembling the same, which can make assembly easy at a body rigging line for vehicles.

2. Discussion of The Background

A typical vehicle body is provided by welding, stamped steel plate parts together at a body welding line to prepare several subassemblies and by assembling the subassemblies into a white body. After the white body is painted at a body painting line, equipment is attached to the painted body at a body rigging line, completing the vehicle body.

A vehicle door to be assembled to a vehicle body is mainly constituted by a door outer panel arranged on an exterior side thereof and a door inner panel arranged on an interior side thereof. Both panels are stamped steal plate parts. The door outer panel and the door inner panel are assembled in a door subassembly by hemming and spot-welding at the body welding line. After the door subassembly is assembled to the body using hinges, painting including electrocoating, intermediate coating and finish coating is applied to the door subassembly at the body painting line. Finally, door equipment such as a door widow glass and a window regulator are assembled to the door at the body rigging line.

With regard to such a vehicle door made of stamped steal plates, attaching the door equipment is carried out with respect to a painted body, i.e., in such a situation that the door outer panel and the door inner panel have jointed together to provide a vehicle door panel 1 as shown in FIG. 4. It is usual that the required door equipment is attached to the door through an access opening 3 formed in the door inner panel 2.

When the door equipments, in particular, large parts such as the window regulator are attached to the door through the narrow access opening 3 in the door inner panel 2, it is necessary to carry out attachment into the door, handling such large parts at the body rigging line. This operation has required a lot of time and could damage the completely painted body. The attaching operation of such large parts through the narrow access opening involves complicated steps. It is extremely difficult to automatize the operation even if an excellent industrial robot is used for instance.

There have been some proposals wherein door equipments are attached to a single plate to provide a module and the module is attached to a door panel. These proposals can eliminate the complication caused by attachment of the respective door equipment through the access opening in a door inner panel.

For example, the following proposal has been disclosed in JP-A-6353112. The door disclosed in the publication has a door outer panel formed from a synthetic resin, and door equipment is mounted to a skeleton sandwiched between the door outer panel and a door inner panel to improve the door assembling operation.

In the vehicle door disclosed in the publication, the skeleton has a window glass sash, and the skeleton is mounted to a body through hinges, functioning as the main portion of the door. Since the door inner panel and the door outer panel work as only covers for covering the interior side and the exterior side of the skeleton, there is created a problem in that the operation for handling the door equipments in mounting the door equipments to the skeleton degrades.

If a fault in the door equipment is found after the skeleton has been attached to the body (irrespectively of prior to and after completion of the vehicle), or if maintenance of the door equipment is carried out in the future, it is difficult to carry out repairing operation without additional operation. The repairing operation is made more difficult since the door equipment have already been mounted to the skeleton. In such a case, if the skeleton itself is removed from the body, poor handling of the skeleton makes the repairing operation for the door equipments difficult because the skeleton functions as the main portion of the door.

Since the skeleton functions as the main portion of the door with the door window glass sash, each type of car necessarily requires preparation of a skeleton suited to the shape of the car. It is difficult to cope with users' car demand which requires a variety of sizes in small run as a recent significant trend, and production control is complicated.

On the other hand, U.S. Pat. No. 4,785,585 has proposed that door equipment be integrally formed with a module plate to provide a door module and the door module is attached to a door panel. In this proposal, the door inner panel has an opening formed therein, and the door module is inserted into the door panel through the opening in the door inner panel, improving ease in door attachment.

In the door disclosed in the US Patent, a cavity is provided between the inner panel and an outer panel and the door module is mounted in the cavity. Since the opening is formed in the inner panel, the door module is inserted into the cavity through the opening to be mounted in the cavity. The door module is attached in the cavity by lifting the door module from a lower end toward an upper end of the opening to insert a door window glass into a belt line formed between the inner panel and the outer panel as shown in the drawings of the US patent.

In order to handle the door module for inserting it into the opening in the operation for inserting and attaching of the door module, two-dimensional movement or three-dimensional movement in some instances is required. Specifically, the door module is moved in a direction perpendicular to a surface of the opening (a direction for advancing the door module toward the opening: a first direction) and a direction in parallel with the surface of the opening (a direction from the lower end of the opening toward the belt line: a second direction) until the door module has been mounted into the cavity. The movement of the door module in the vicinity of the opening is one that is at least a combination of the movement in the first direction and that in the second direction.

Such movement of the door module is a bar to automatize the manufacture of vehicles including doors. Rapid and simple assembly of doors by a robot in an assemble line for vehicles can significantly contribute to automation of the manufacture of the vehicles. However, the movement which is constituted by combined movement in a plurality of directions is complicated. It is not easy to carry out attachment of such a door module into the cavity by use of a robot.

In the door disclosed in the US patent, the door module as a whole becomes a large part due to the integration of the door equipments thereto. For this reason, it is necessary to develop measures to solve the problem as stated, which is inherent to the large part in handling the large part for attachment, and which is not created when the door equipment is independently mounted as usual. Since the door according to the US patent is proposed without considering the problem due to an increase of the part size, it is not possible to improve the assembling operation for the door though the door equipments are integrally formed with the module plate. In particular, since a vehicle door has a door lock attached thereto so as to provide a projection on a rear end of a door inner panel, a three-dimensional movement is required.

As a measure to solve interference by members projecting from front and rear ends of a door, there is one that has been disclosed in U.S. Pat. No. 4,850,636 for instance. The door disclosed in the US patent has such a structure that a door module is inserted from a front end with respect to a door panel. However, this structure has required that hinges for opening and closing the door be attached to the door module. This creates a problem in that the attaching arrangement for the hinges which plays an important role for opening and closing the door can not ensure sufficient strength. If e.g. attaching position of the hinges is adjusted to solve this problem, mounting adjustment between the contour of the door itself and a door opening in the vehicle body becomes difficult. It is required that the door panel be mounted after the door module has been attached to the body through the hinges. In order to match the outer panel with the body in terms of a tone of color, painting must be carried out with the door equipment assembled into the door panel. This means that door equipment is exposed to a paint.

SUMMARY OF THE INVENTION

It is an object to the present invention to provide a vehicle door and a method for assembling the same capable of improving the assembling operation for door equipment, considering the problems of the prior art.

In order to attain the object, the vehicle door according to the present invention is characterized in that it comprises at least a door panel which includes an outer panel and an inner panel to confront the outer panel, which has the outer panel and the inner panel joined together to provide a space therebetween and which has a front end to be fixed to a vehicle body so as to be opened and closed; and an equipment mounting panel which includes door equipment and an equipment panel body with the door equipment provided thereto in advance; wherein the equipment mounting panel is introduced into the space through a rear end opening formed in a rear end surface of the door panel on a side opposite the front end to be attached to the vehicle body to be mounted in the door panel so as to expose certain parts of the door equipments from the rear end opening.

In addition, the method for assembling a vehicle door according to the present invention is characterized in that it comprises providing a door panel which includes an outer panel and an inner panel to confront the outer panel, which has the outer panel and the inner panel joined together to provide a space therebetween and which has one end to be fixed to a vehicle body so as to be opened and closed; and providing an equipment mounting panel which includes door equipment and an equipment panel body with the door equipment provided thereto in advance; wherein the equipment mounting panel is introduced into the space through a rear end opening formed in a rear end surface of the door panel on a side opposite the one end to be attached to the vehicle body to be mounted in the door panel so as to expose certain parts of the door equipment from the rear end opening.

DETAILED DESCRIPTION OF THE PREFERRED EMBODIMENTS

Figure 1:
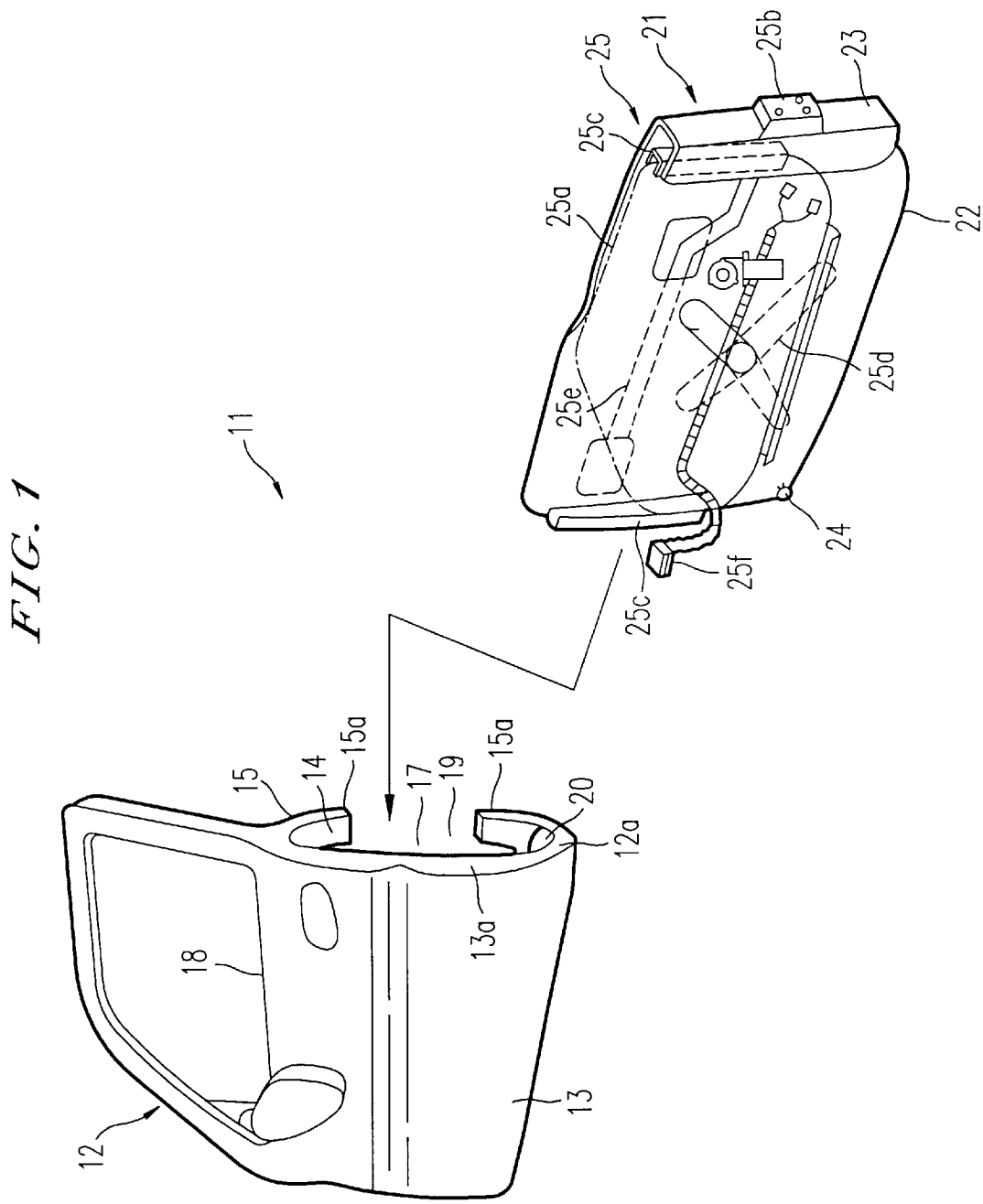
FIG. 1 is an exploded perspective view showing an example of the vehicle door according to the present invention.

In FIG. 1 is shown an exploded perspective view of an example of the vehicle door according to the present invention, wherein the vehicle door 11 is constituted by a door panel 12 to be mounted to a vehicle body so as to be opened and closed and an equipment mounting panel 21 including various kinds of door equipments 25 which perform required door functions by mounting the equipment mounting panel in the door panel 12.

Among these members, the door panel 12 with appropriate functions and structure such as a sash door, a sashless door and a panel door is prepared from an outer panel 13 and an inner panel 15 to confront the outer panel 13 so as to provide a space 14 therebetween and to cover an interior side of the outer panel 13. In this case, the space 14 has a vertical size and a lateral size which are determined by a standardized size of the equipment mounting panel 21 to be mounted.

Figure 2:
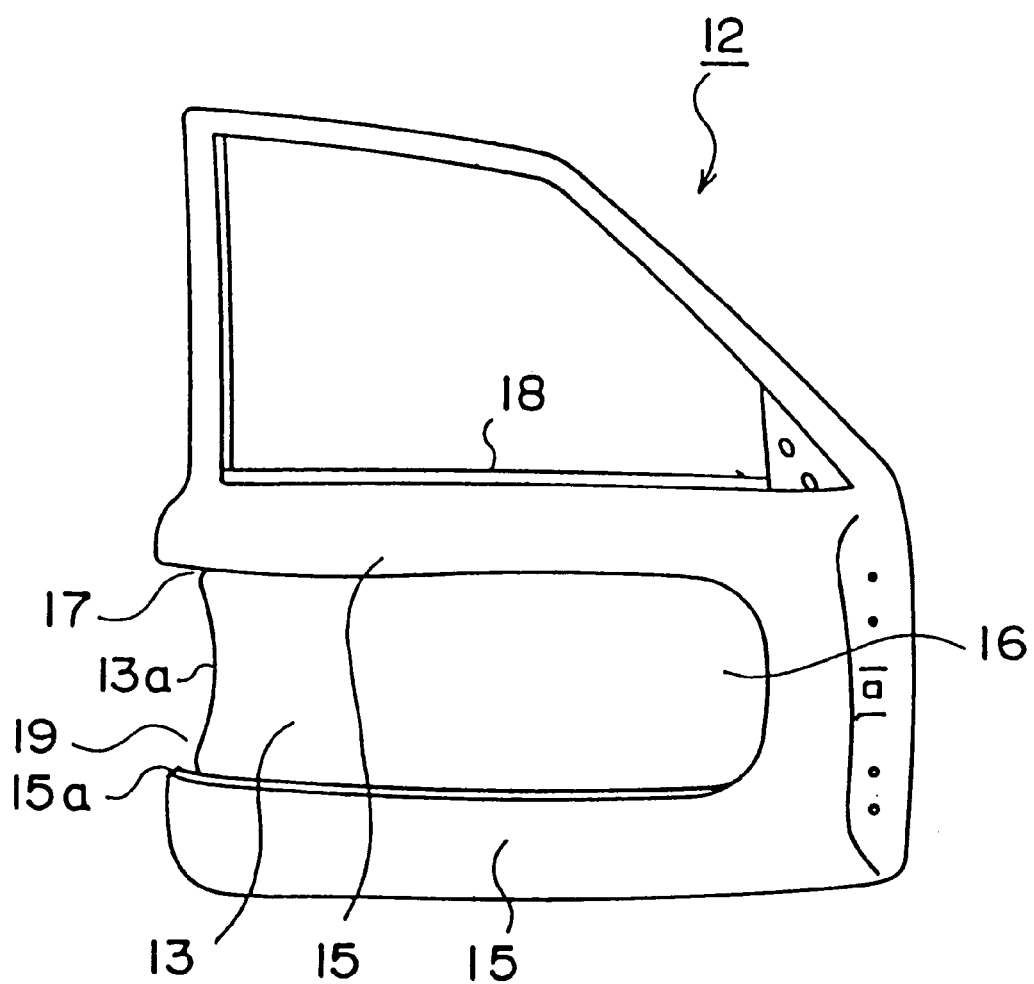
FIG. 2 is a front view showing an example of the door panel shown in FIG. 1 as viewed from an inner panel side.

The inner panel 15 has a portion confronting the outer panel 13 formed with a confronting opening 16 so as to expose parts of the door equipment 25 to be exposed to an interior side of the vehicle as shown in FIG. 2. The door panel 12 has a rear end opening 17 formed therein between a rear end 13a of the outer panel 13 and a rear end 15a of the inner panel 15 on a side opposite a side to be attached to the vehicle body (on a rear side of the door)in order to introduce the equipment mounting panel 21 into the space 14 and to project a door lock 25b and the like from the door panel 12 so as to be exposed. The door panel also has a door window glass opening 18 formed between an upper edge of the inner panel 15 and a portion of the outer panel 13 located in the vicinity of the upper edge of the inner panel in order to lift a door window glass 25a as one of the door equipment 25.

On the other hand, the equipment mounting panel 21 is introduced into the space 14 through the rear end opening 17 in the door panel 12 to be mounted in the door panel 12. In this case, the confronting opening 16 and the rear end opening 17 are closed by a side surface and a rear end surface (a bent concealing portion 23) of the equipment mounting panel 21 so that required parts of the door equipment 25 are exposed. The equipment mounting panel 21 is constituted by a mounting panel body 22 to be located in the door panel 12 and the door equipment 25 to be mounted in the mounting panel body 22.

Among these members, the mounting panel body 22 has a rear end in the introduction direction provided with the bent concealing portion 23 which has such an appropriate length and an appropriate width so as to close the rear end opening 17 when the mounting panel body is located in the door panel 12. The bent concealing portion 23 is provided with the door lock 25b with a latch included therein as one of the door equipments 25.

Besides the door window glass 25a and the door lock 25b, the door equipment 25 contain a regulator 25d for controllably lifting the door window glass 25a along a pair of guide pieces 25c, 25c attached to the mounting panel body 22, an inner handle related part 25e arranged at a position to close the confronting opening 16 in the inner panel 15, a harness 25f and other adequately required parts.

In the shown example, the inner panel 15 has a portion confronting the door equipment 25 formed with a cutaway portion 19 and the confronting opening 16 to extend to the rear end opening 17. By such arrangement, the door equipment 25 can be introduced into the confronting opening 16 through the cutaway portion 19 without contacting the door equipment 25 with the inner panel 25. When the door equipments 25 is not so thick, the door equipments 25 does not interfere with the inner panel 15 and the outer panel 13 during introduction of the equipment mounting panel 21. In that case, the door panel may be formed in an envelop shape without the provision of the cutaway portion 19 and the confronting opening 16 (that case will be explained later). In that case, the inner panel 15 can have an opening similar to the confronting opening 16 formed therein to expose the inner handle related part 25e and so on among the door equipments 25 to the interior side.

From the viewpoint that the mounting operation of the equipment mounting panel 21 into the door panel 12 can be smoothly carried out, the door panel 12 has an inner bottom surface 12a provided with a single guide rail 20 in advance for instance. If the equipment mounting panel 21 has at least a bottom surface on a front end thereof provided with a roller 24 in this case, the equipment mounting panel 21 can be introduced into the door panel 12, being guided by the guide rail 20 through the roller 24. When necessary, the equipment mounting panel 21 may have a bottom surface on an intermediate portion thereof and a bottom surface on a rear end thereof provided with rollers 24 in addition to the front end of the equipment mounting panel 21.

The door panel 12 forming the vehicle door 11 according to the present invention has the interior side of the inner panel 15 concealed and covered by an inner trim (not shown).

Normally, the equipment mounting panel 21 has to meet different requirements, depending on the kind of vehicles. On the other hand, the equipment mounting panel 21 may be common parts among some kinds of vehicles. By the adoption of common parts, what is required to be changed so as to be suited to the kind of a vehicle is only a door panel, and the equipment mounting panel 21 as a whole can be treated as a single common part. In the other words, even if there is a difference in terms of the size of the door window glass 25a or the detail of the inner handle related parts 25e for instance, some groups of equipment mounting panels 21 can be common parts without increasing the number of the kinds of the equipment mounting panels 21 than the number of the kinds of vehicles or the number of the kinds of the different details.

Now, the assembly of the vehicle door according to the present invention will be explained. The door panel 12 is integrally fabricated from the outer panel 13 having an appropriate structure and the inner panel 15 joined to the outer panel 13 so as to provide the space 14 between the outer panel 13 and the inner panel. The door panel thus fabricated can be assembled to the vehicle body by a single assembling process using door hinges.

On the other hand, the equipment mounting panel 21 is fabricated from the mounting panel body 22 and the various kinds of door equipment 25 mounted on the mounting panel body 22. By using jigs on the mounting panel body 22, the door equipments 25 can be automatically assembled to each vehicle body with high precision by e.g. an industrial robot in an independent assembling process without damaging the painted body.

When the door equipments 25 interfere with the inner panel 15, the cutaway portion 19 and the confronting opening 16 can be provided in the portion of the inner panel 15 corresponding to the door equipments 25 so as to extend to the rear end opening 17, allowing the equipment mounting panel 21 to be smoothly put into the door panel 12.

The equipment mounting panel 21 with the required door equipment 25 assembled to the mounting panel body 21 thereof can be mounted to the door panel 12 attached to the vehicle body by simply putting the equipment mounting panel into the space 14 through the rear end opening 17. In this case, some preparation for e.g. lowering the door window glass 25a to a lower limit may be carried out in advance.

The mounting operation of the equipment mounting panel is a simple operation wherein the equipment mounting panel 21 is approached to the door panel 12 attached to the vehicle body, being erected, and the equipment mounting panel is introduced in the door panel 12, being kept erected. The mounting operation is suited to automation using a robot or a special purpose device.

When the equipment mounting panel 21 has been mounted, the rear end opening 17 of the door panel 12 is covered by the bent concealing portion 23 of the mounting panel body 22. In addition, some of door equipment 25 such as the door lock 25b attached to the bent concealing portion 23 and the inner handle related part 25e mounted to the mounting panel body 22 are exposed. The vehicle door 11 is thus fabricated, completing the assembling process.

The vehicle door 11 is constituted by two separate members of the door panel 12 and the equipment mounting panel 21 which are easy to handle. Such arrangement can remarkably shorten the assembling time at a body line since the equipment mounting panel 21 can be mounted and assembled to the door panel 12 with only the door panel attached to the vehicle body. In this case, the door panel having a rigidity can be attached to the vehicle body through the hinges to provide the door with a sufficient strength to withstand opening and closing of the door.

Figure 3:
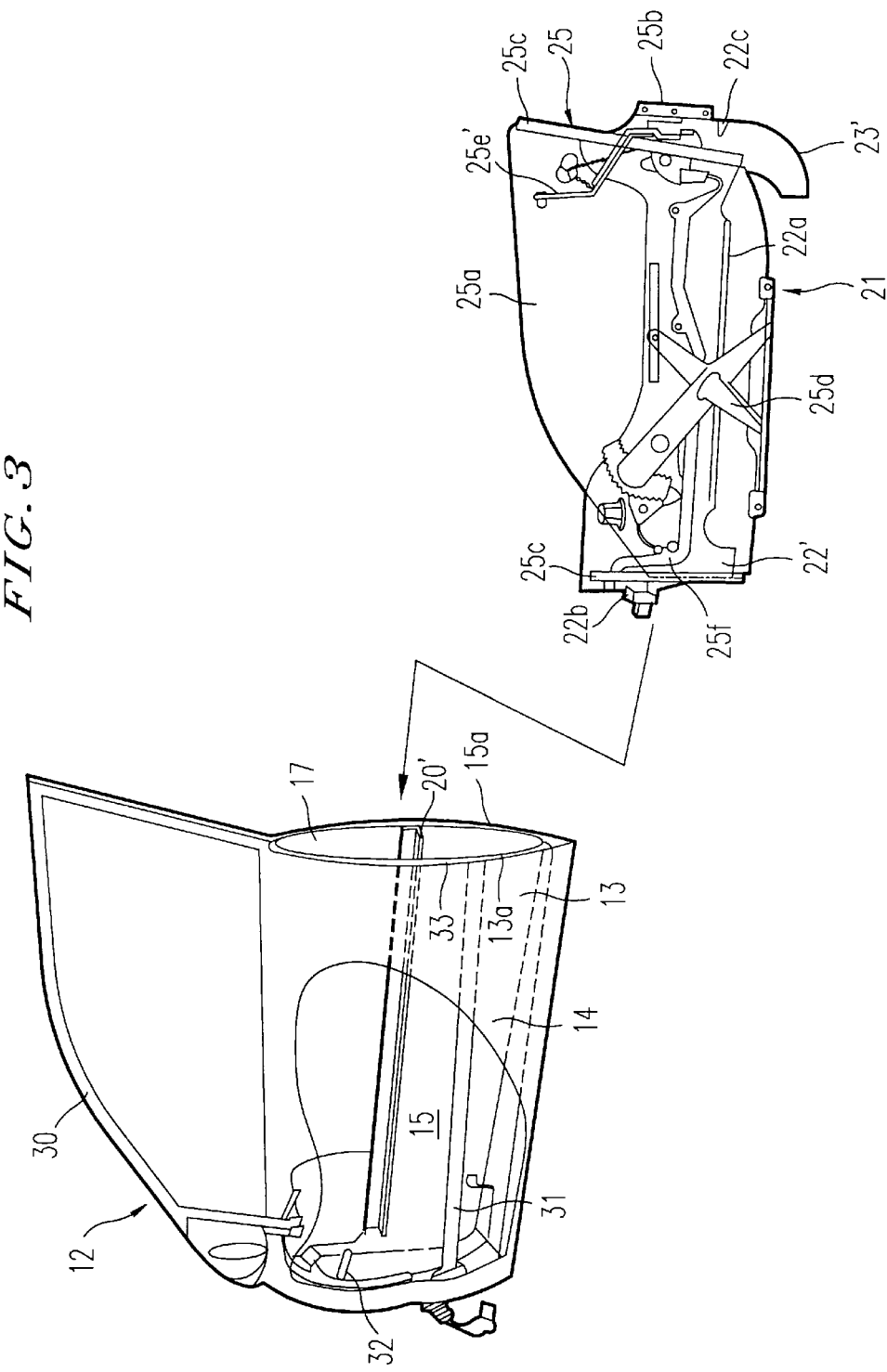
FIG. 3 is an exploded perspective view with a portion cut away showing another example of the vehicle door according to the present invention.
Figure 4:
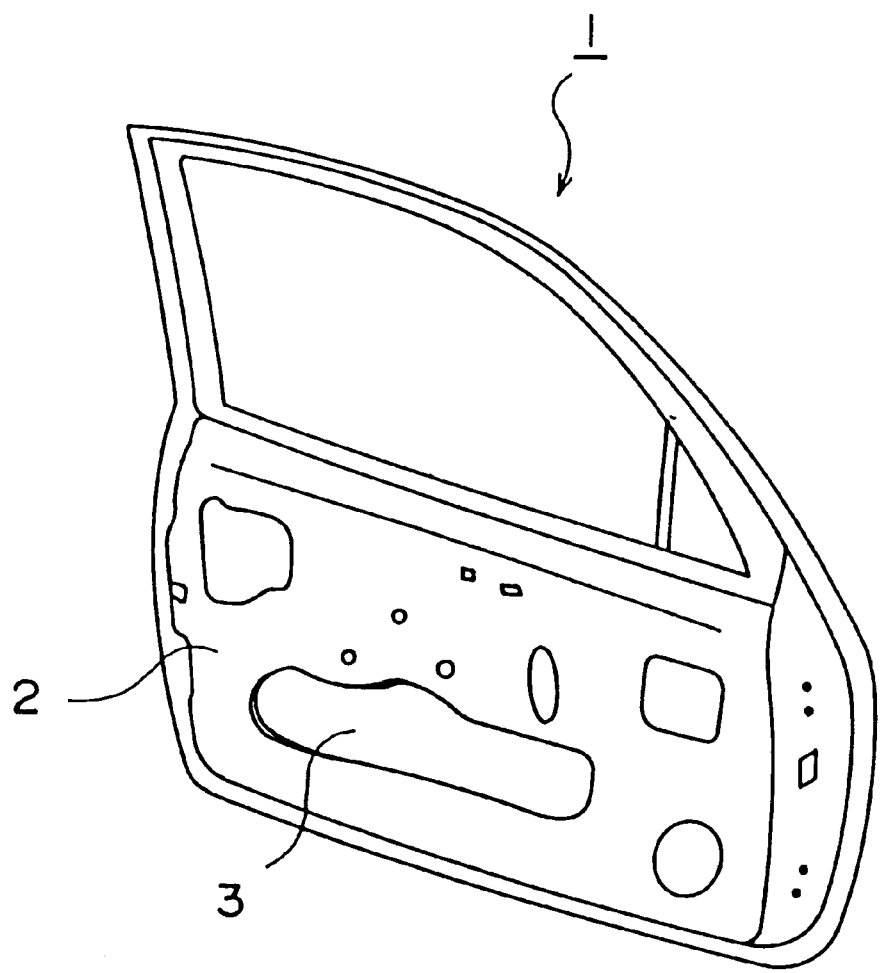
FIG. 4 is a front view showing an example of a conventional vehicle door as viewed from an interior side.

The explanation as stated above has been made with respect to one specific example in order to give easy comprehension of the vehicle door according to the present invention, and the scope of the invention is not limited to the example. For example, the door panel may be formed in an envelop shape without provision of the cutaway portion 19 and the confronting opening 16 shown in FIG. 1. Such a modification is shown in FIG. 3. In FIG. 3 is shown a vehicle door according to the present invention as viewed from the exterior side, and a portion of the outer panel 13 is cut away for illustration.

The door panel 12 is mainly fabricated from the outer panel 13, the inner panel 15 and a sash 30 provided above the outer panel and the inner panel. The outer panel 13 and the inner panel 15 are joined together so as to confront each other. Both panels are formed in an envelop shape so as to provide the space 14 therebetween for housing the equipment mounting panel 21 therein. The opening of the envelop shaped structure forms the rear end opening 17 which is defined by the rear end 13a of the outer panel 13 and the rear end 15a of the inner panel 15. The outer panel 13 has a door beam 31 formed thereon to provide the door with a higher rigidity. The inner panel has a substantially central portion formed with a guide rail 20' to extend in front and rear directions of the door.

The equipment mounting panel 21 is fabricated from a mounting panel body 22' and the door equipments 25. The door equipments contain the door window glass 25a, the door lock 25b, the paired front and rear guide pieces 25c, 25c for guiding the lifting operation of the door window glass 25a, the regulator 25d for lifting the door window glass 25a, an inner handle related part 25e' for opening and closing the door, the harness 25f and so on. The door equipments 25 are integrally mounted to the mounting panel body 22', forming the equipment mounting panel 21.

The mounting panel body 22' has a sliding piece 22a formed thereon so as to extend the front and rear directions of the door. The sliding piece 22a is used when the equipment mounting panel 21 is introduced into the space 14 of the door panel 12.

Specifically, when introducing the equipment mounting panel, the equipment mounting panel 21 is introduced into the space 14 of the door panel 12, sliding the sliding piece 22a along the guide rail 20'. In addition, the door panel side assembly reference pin 32 which projects toward the space 14 from a front side of the door panel 12 is inserted into a mounting panel side assembly reference hole 22b which is formed in a front side of the mounting panel body, and a mounting panel side assembly reference pin 22c which projects forwardly from a rear side of the mounting panel body is inserted into a door panel side reference hole 33 which is formed in the rear end 13a of the outer panel 13. Such arrangement can locate the equipment mounting panel 21 at a certain position in the space 14 of the door panel 12. Thus, alignment is provided between suitable holes formed in the inner panel 15 and corresponding holes formed in the mounting panel body 22', and the equipment mounting panel 21 can be fixed to the door panel 12 by e.g. bolts, using these holes.

The mounting panel body 22' has a rear end provided with a bent concealing portion 23'. Although the rear end opening 17 is concealed by the bent concealing portion 23', an additional concealing member may be attached in a subsequent process as required if the rear end opening 17 can not be completely covered only by the bent concealing portion 23'.

In the modified example as well, the equipment mounting panel 21 can be mounted to the door panel 12 by movement in a one-dimensional direction (the front and rear directions of the door) without interference with the door lock 25b projecting from a rear end of the door panel 12. The door equipments can be easily assembled to the door by a simple industrial robot for instance without requiring complicated mounting movement. With regard to painting, there is involved no trouble in tone of color since both of the door panel and the vehicle body can be painted with only the door panel attached to the vehicle body. The door panel having a rigidity can be attached to the vehicle body through the hinges to provide the door with a sufficient strength to withstand opening and closing the door.

The material, the shape and the structure of the door panel and the equipment mounting panel can be adequately changed, depending on the requirements for a vehicle door which the vehicle door according to the present invention is applied to. The confronting opening in the inner panel may be formed in an appropriate shape at an appropriate position so as to expose certain parts of the door equipment to be exposed.

The door panel according to the present invention can fixedly join the inner panel to the outer panel, and may fabricate the outer panel and the inner panel as a one-piece construction as required.

The provision of the inner trim on the interior side of the inner panel can improve aesthetic appearance. In this case, it is preferable that the boundary between the inner panel and the equipment mounting panel is covered by the inner trim. Such arrangement can prevent the boundary between the inner panel and the equipment mounting panel from being clearly seen from the interior side. In particular, when the door has end surfaces covered by the inner trim, the equipment mounting panel can be formed in a stepwise shape so as to have an interior side thereof inwardly indented to ensure the location for arranging the inner trim.

INDUSTRIAL APPLICABILITY

In accordance with the present invention, the door equipment is attached to the mounting panel body to provide the equipments mounting panel, and then the equipment mounting panel is put into the door panel through the rear end opening, realizing easy mounting without using any access opening having low operating performance. In particular, when the door equipment contain the door lock an so on, the door lock is mounted so as to project from the contour of the door panel. By providing the opening to the rear end of the door panel body with the door lock projecting therefrom, and putting the equipment mounting panel into the door panel body through the rear end opening, the mounting operation can be simplified since it is not accompanied by two-dimensional or three-dimensional movement. Since the equipment mounting panel is fabricated by preattaching the required door equipment to the mounting panel body, the equipments mounting panel is good at handling.

As a result, a time required for assembling a door can be shortened to increase the productivity in the body rigging line, and the easy operation can prevent the vehicle body from being damaged and can easily realize automation by e.g. an industrial robot.

Since the door panel body and the equipment mounting panel are separate members, inspection, repair and exchange of equipment such as the door window glass and the regulator can be easily carried out for maintenance of a perfected car. In the maintenance, the inspection, the repair and the exchange can be carried out simply since the equipment mounting panel is easy to be handled in the maintenance, the inspection, the repair and the exchange.

When the inner panel of the door panel body is provided with the cutaway portion extending between the confronting opening and the rear end opening, the mounting design of the door equipment with respect to the mounting panel body can increase design freedom to versatilely cope with users' needs.

When the guide rail is provided on the door panel and when the roller or the sliding piece is provided on the equipment mounting panel, the equipment mounting panel can be smoothly put into the door panel body, moving the roller or the sliding piece along the guide rail, to be mounted to the door panel body, carrying out the mounting operation more smoothly. In this case, the equipment mounting panel can be positioned in the door panel with a high positional precision.

What is claimed is:

1. A vehicle door comprising:
   at least a door panel which includes an outer panel and an inner panel confronting the outer panel, the outer panel and the inner panel joined together to provide a space therebetween and defining a rear end opening in a rear end surface of the door panel, a front end of the door panel constructed to be fixed to a vehicle body so as to be opened and closed; and
   an equipment mounting panel which includes door equipment and an equipment panel body with the door equipment mounted thereon;

wherein the equipment mounting panel is introduced into the space through the rear end opening in the rear end surface of the door panel, the equipment mounting panel mounted in the door panel so as to expose certain parts of the door equipment from the rear end opening.

2. A vehicle door according to claim 1, wherein the inner panel has a portion corresponding to the door equipment formed with an opening confronting parts of the door equipment exposed to an interior side of the vehicle, and a cutaway portion extending from the opening in the inner panel to the rear end opening.

3. A vehicle door according to claim 2, wherein the inner panel has an inner bottom surface provided with a guide rail, and the equipment mounting panel has at least a bottom surface on a front end thereof provided with a roller to be guided by the guide rail.

4. A vehicle door according to claim 1, wherein the inner panel has an inner bottom surface provided with a guide rail, and the equipment mounting panel has at least a bottom surface on a front end thereof provided with a roller to be guided by the guide rail.

5. A vehicle door according to claim 1, wherein the inner panel has a substantially central portion provided with a guide rail extending in front and rear directions of the door, the mounting panel body is provided with a sliding piece extending in the front and rear directions of the door, and the sliding piece is guided by the guide rail to introduce the equipment mounting panel into the door panel.

6. A method for assembling a vehicle door comprising:
providing a door panel which includes an outer panel and an inner panel to confront the outer panel, the outer panel and the inner panel joined together to provide a space therebetween defining a rear end opening in a rear end surface of the door panel, a front end of the door panel constructed to be fixed to a vehicle body so as to be opened and closed; and
providing an equipment mounting panel which includes door equipment and an equipment panel body with the door equipment mounted thereon equipments provided thereto in advance; and
introducing the equipment mounting panel into the space through the rear end opening so as to expose certain parts of the door equipment from the rear end opening.

7. A method for assembling a vehicle door according to claim 6, wherein the inner panel has a portion corresponding to the door equipment formed with an opening confronting parts of the door equipment exposed to an interior side of the vehicle, and a cutaway portion extending from the opening in the inner panel to the rear end opening.

8. A method for assembling a vehicle door according to claim 7, wherein the inner panel has an inner bottom surface provided with a guide rail, and the equipment mounting panel has at least a bottom surface on a front end thereof provided with a roller to be guided by the guide rail.

9. A method for assembling a vehicle door according to claim 8, comprising:
fixing the front end of the door panel to the vehicle body; and
wherein the step of introducing the mounting panel into the space in the door panel occurs after the door panel has been fixed to the vehicle body.

10. A method for assembling a vehicle door according to claim 7, comprising:
fixing the front end of the door panel to the vehicle body; and
wherein the step of introducing the equipment mounting panel into the space in the door panel occurs after the door panel has been fixed to the vehicle body.

11. A method for assembling a vehicle door according to claim 6, wherein the inner panel has an inner bottom surface provided with a guide rail, and the equipment mounting panel has at least a bottom surface on a front end thereof provided with a roller to be guided by the guide rail.

12. A method for assembling a vehicle door according to claim 11, comprising:
fixing the front end of the door panel to the vehicle body; and
wherein the step of introducing the equipment mounting panel into the space in the door panel occurs after the door panel has been fixed to the vehicle body.

13. A method for assembling a vehicle door according to claim 6, wherein the inner panel has a substantially central portion provided with a guide rail extending in front and rear directions of the door, the mounting panel body is provided with a sliding piece extending in the front and rear directions of the door, and the sliding piece is guided by the guide rail to introduce the equipment mounting panel into the door panel.

14. A method for assembling a vehicle door according to claim 13, comprising:
fixing the front end of the door panel to the vehicle body; and
wherein the step of introducing the mounting panel into the space in the door panel occurs after the door panel has ben fixed to the vehicle body.

15. A method for assembling a vehicle door according to claim 6, comprising:
fixing the front end of the door panel to the vehicle body; and
wherein the step of introducing the equipment mounting panel into the space in the door panel occurs after the door panel has been fixed to the vehicle body.

* * * * *